2,938,021
PROCESS FOR THE PURIFICATION OF HIGHLY POLYMERIZED ETHYLENE

Nikolaus Geiser, Oberhausen-Holten, and Helmut Kolling, Duisburg-Hamborn, Germany, assignors to Ruhrchemie Aktiengesellschaft, Oberhausen-Holten, Germany No Drawing. Filed May 13, 1958, Ser. No. 734,840

1 Claim. (Cl. 260—94.9)

The present invention is a continuation-in-part of our co-pending application Serial No. 545,995, filed November 9, 1955, and now abandoned, and relates to the purification of highly polymerized ethylene by treatment with a saturated solution of gaseous hydrochloric acid in a lower aliphatic alcohol, whereby an improved polyethylene with an unusually low ash content is obtained.

In the production of highly polymerized hydrocarbons, for example in the production of polyethylene from olefin-containing gases freed from detrimental contaminations, by means of organo-metallic compounds, e.g. by means of a catalyst consisting of a mixture of titanium tetrachloride and aluminum alkyl compounds, the molecular weight of the high polymers may be varied within rather wide limits, ranging from about 20,000 to more than 1,000,000, by varying the mixing proportion of the two catalyst components. Thus, for example, a polyethylene having a molecular weight of about 900,000 is obtained by use of a catalyst consisting of one mol titanium tetrachloride and 10 mols aluminum diethyl monochloride, while a catalyst consisting of 1 mol titanium tetrachloride and 1 mol aluminum diethyl monochloride yields a polyethylene having a molecular weight of about 50,000. The polymerization is generally effected in the presence of an inert solvent, for example in the presence of saturated aliphatic hydrocarbons which have substantially been freed from oxygen-containing compounds.

It is required that the polymer, after mechanical separation of the bulk of the solvent, be freed from the residual portions of said solvent. This may be effected in various manners. According to one suggestion, the residue of the solvent is removed by a treatment with steam. According to another suggestion, the treatment with steam may also be carried out in the presence of water or alkali hydroxides. Finally, the solvent may also be removed by a thermal treatment and/or a treatment under vacuum. In this procedure an inert gas as, for example, nitrogen, or purified ethylene may be used, if necessary or desired. The aliphatic hydrocarbons generally used as the solvent may also be separated from the polymer by an extraction with alcohols or other solvents, preferably water-soluble oxygen-containing solvents, such as acetone. When removing the residual solvent in this manner, a part of the catalyst present in the polymer is simultaneously removed. However, the polyethylene, when dried after this treatment, still contains considerable portions of residual catalyst which are disturbing in the further use, for instance for electrical purposes.

The separation of these residual catalyst portions was hitherto effected by a treatment with dilute or concentrated mineral acids, such as hydrochloric acid, nitric acid, or sulfuric acid at temperatures below 100° C. The success of the treatment with acid was largely dependent upon the type of the catalyst used. In the production of very high molecular weight polymers, for example in the production of polyethylene having molecular weights in excess of 500,000, products having ash contents of as low as 0.06% by weight are obtained after treatment with acid, subsequent neutralization by washing, and drying. When, however, for the production of polymers of substantially lower molecular weight as, for example, for the production of polyethylene having molecular weights of about 50,000, catalysts with a higher titanium content are used, e.g. a catalyst consisting of 1 mol titanium tetrachloride and 1 mol aluminum diethyl monochloride, then the finished products still have ash contents of 0.1–0.15% by weight after treatment with acid, washing and drying.

It has now been found that the ash content can be lowered much more extensively if the polymerized product which, after polymerization in the presence of solvents, is separated from the same and simultaneously treated with hydrogen chloride and preferably water-soluble alcohols, and is subsequently neutralized by washing. It is surprising that this process permits obtaining polymers having ash contents of less than 0.03% even when low molecular weight polymers are produced.

The process according to the invention may be carried out in various manners. The polymer to be freed from ash may be extracted in an extraction apparatus with alcohol, e.g. with ethanol, while simultaneously introducing a current of hydrogen chloride gas. The treatment may also be effected in a stirring vessel or in a circulating apparatus in which the polymer and the alcohol are circulated by means of a pump or, especially in continuous operation, it may be effected in a screw conveyor or devices of similar construction.

The temperature in the treatment should not substantially exceed 100° C. since otherwise sintering and clouding of the polymer occur. In general, temperatures of between 60° and 80° C. are used.

The alcohols used are preferably water-soluble alcohols since in this case the alcohol after the treatment can easily be removed during the neutralization by washing with water. The concentration of the alcohols should be above 50% by weight.

The treatment of the polymer with hydrogen chloride and alcohol in accordance with the invention is preferably effected after extensive or complete separation of the solvent. This separation may, for example, be attained by a treatment with steam, which is of advantage because otherwise the solvent used as, for example, a hydrocarbon fraction, would be contaminated with alcohols so that a re-use would only be possible after careful purification from all oxygen-containing compounds.

The process according to the invention will now be further described in the following examples, but it should be understood that these are given by way of illustration and not of limitation and that many changes in the details may be made without departing from the spirit of the invention.

EXAMPLE 1

The polymerization of ethylene was effected at temperatures below 80° C. with the use of a substantially saturated aliphatic $C_8$–$C_{10}$ hydrocarbon fraction freed from oxygen-containing compounds and with the use of a catalyst consisting of 1 mol titanium tetrachloride and 10 mols aluminum diethyl monochloride. After the separation of the bulk of the hydrocarbon fraction by filtration, the polymer, in a screw conveyor, was freed from the residues of solvent by a treatment with hot steam of 100° C. There was obtained a fine-grained polymer which had a molecular weight of 65,000 and, after drying, an ash content of 0.20%.

100 grams of the polymer thus obtained were treated in a stirring vessel with 700 grams of concentrated hydrochloric acid for about 4 hours at 70° C., subsequently freed from acid by washing with water and dried. The finished product had an ash content of 0.13%.

Another portion of the polymer, after the treatment with steam, was treated in a stirring vessel for 4 hours at about 70° C. with 7 times its quantity of 96% ethyl alcohol, subsequently washed with water and dried. The finished product had an ash content of 0.18 by weight.

A further portion of the steam-treated polymer was now treated in a stirring vessel in accordance with the invention for 4 hours at about 70° C. with 7 times its quantity of 96% ethyl alcohol which had previously been saturated with hydrogen chloride gas. During this treatment, sufficient hydrogen chloride was introduced so that a slight excess of hydrogen chloride escaped from the stirring vessel. After this treatment the polymer was neutralized by washing and dried. The finished product had an ash content of only 0.01%.

If a 50% ethyl alcohol was used instead of the 96% ethyl alcohol, the ash content amounted to 0.02%.

A portion of the steam-treated polymer was filled into a Soxhlet extraction apparatus and treated with 96% isopropyl alcohol. At the same time, sufficient hydrogen chloride was introduced so that a slight excess of hydrogen chloride escaped. After 4 hours, the treatment was discontinued and the polymer was freed from acid by washing, and dried. The finished product had an ash content of 0.02%.

EXAMPLE 2

The polymerization of ethylene was effected at temperatures below 80° C. with the use of a catalyst consisting of 1 mol titanium tetrachloride and 1 mol aluminum diethyl monochloride, with no inert solvent being contained in the reaction vessel. The polymer was treated for 4 hours in a Soxhlet extraction apparatus with 96% ethyl alcohol while simultaneously introducing sufficient hydrogen chloride so that a small portion of the hydrogen chloride escaped at the top of the extraction apparatus. It then was freed from acid by washing, and dried. The finished product had an ash content of 0.02%.

EXAMPLE 3

The polymerization of ethylene was effected at temperatures between 75° and 80° C. with the use of a saturated aliphatic $C_8$–$C_{10}$ hydrocarbon fraction which had previously been hydrogenated at 250° C. over a nickel catalyst. The catalyst used was a mixture of 1 mol titanium tetrachloride and 2 mols triisobutyl aluminum. Upon termination of the polymerization, the bulk of the hydrocarbon fraction was separated by filtration, the polymer was freed from residues of solvent by treatment with steam and subsequently dried. The polymer had a molecular weight of about 500,000 and an ash content of about 0.10% by weight.

100 grams of this product were treated in a stirring vessel for 2 hours at about 80 C. with 1000 ml. of n-propyl alcohol which had a concentration of 99.8% and had previously been saturated with hydrogen chloride. During the whole time of stirring, a slight stream of hydrogen chloride was passed through the stirring vessel. Following this, the polymer was filtered off, freed from acid by washing with alcohol and dried. The finished product had an ash content of 0.002% by weight. A pressed film made with this product was of pure white color.

EXAMPLE 4

The polymerization of ethylene was effected at a temperature of about 80° C. using the same hydrocarbon fraction as in Example 3. The catalyst used was a mixture of 1 mol titanium tetrachloride and 1.5 mols diethyl aluminum monochloride. Upon termination of the polymerization, the bulk of the hydrocarbon fraction was removed by filtration and the polymer was freed from the residue of solvent by a treatment with steam and subsequently dried. In this manner a polymer having a molecular weight of 250,000 and an ash content of 0.13% by weight was obtained.

100 grams of this polymer were treated in a stirring vessel for 2 hours at a temperature of about 90° C. with 1000 ml. n-butylalcohol, the concentration of which was 99% and which had previously been saturated with hydrogen chloride. During this treatment, a slight stream of hydrogen chloride was passed through the stirring vessel. Following this, the polymer was filtered off, freed from acid by washing with the same alcohol, and dried. The finished product had an ash content of 0.005% by weight.

EXAMPLE 5

The polymerization was effected in the manner described in Example 4. Upon termination of the reaction, the bulk of the hydrocarbon fraction was removed by filtration and the polymer was then freed from the residues of solvent by blowing through it oxygen-free nitrogen at about 100° C. In this manner, a polymer having a molecular weight of 250,000 and an ash content of 0.15% by weight was obtained.

100 grams of this polymer were treated in a stirring vessel for about 3 hours at about 80° C. with 1000 ml. isopropyl alcohol which had a concentration of 95% and which had previously been saturated with hydrogen chloride. During this treatment, a slight stream of hydrogen chloride was passed through the stirring vessel. The polymer was then filtered off, freed from acid by washing with the same alcohol, and dried. The finished product had an ash content of 0.007% by weight and gave a pressed film of pure white color.

EXAMPLE 6

The polymerization of ethylene was effected at a temperature of about 80° C. using the same hydrocarbon fraction as in Example 3. The catalyst used was a mixture of 1 mol titanium tetrachloride and 4 mols diisobutyl aluminum monochloride. Upon termination of the polymerization, the bulk of the hydrocarbon fraction was separated by filtration and the polymer was freed from the residues of solvent by a treatment with steam and dried. The polymer obtained had a molecular weight of about 800,000 and an ash content of 0.15% by weight.

100 grams of this polymer were treated in a stirring vessel for 4 hours at about 75° C. with 1000 ml. 96% ethyl alcohol which had previously been saturated with hydrogen chloride. During this treatment, a slight stream of hydrogen chloride was passed through the stirring vessel. Following this, the polymer was filtered off, neutralized by washing with water, and dried. The finished product had an ash content of 0.010% by weight.

EXAMPLE 7

The polymerization of ethylene was effected at a temperature of about 80° C. using the same solvent as in Example 3. The catalyst used was a mixture of 1 mol titanium tetrachloride and 10 mols diethyl aluminum monochloride. Upon termination of the polymerization, the bulk of the hydrocarbon was separated by filtration and the polymer was freed from the residues of solvent by a treatment with steam and dried. The resultant polymer had a molecular weight of about 1,000,000 and an ash content of 0.14% by weight.

100 grams of this polymer were treated for 4 hours at about 60° C. with 1000 ml. 99% methyl alcohol which had previously been saturated with hydrogen chloride. During this treatment, a slight stream of hydrogen chloride was passed through the stirring vessel. Following this, the polymer was filtered off, freed from acid by washing with alcohol, and dried. The finished product had an ash content of 0.018% by weight.

EXAMPLE 8

The polymerization of ethylene was effected at about 80° C. using the same solvent as in Example 3. The catalyst used was a mixture of 1 mol titanium tetrachloride and 2 mols monoethyl aluminum dichloride. Upon termination of the polymerization and separation of the bulk of the hydrocarbon fraction by filtration, the polymer was freed from the residues of solvent by a treatment with steam and then dried. The resultant polymer had a molecular weight of about 200,000 and an ash content of 0.2% by weight.

100 grams of this polymer were treated in a stirring vessel for about 3 hours at about 75° C. with 99.5% n-propyl alcohol which had previously been saturated with hydrogen chloride. During this treatment, a slight stream of hydrogen chloride was introduced. Following this, the polymer was filtered off, neutralized by washing with alcohol, and dried. The finished product had an ash content of 0.002% by weight.

EXAMPLE 9

The polymerization of ethylene was effected at about 80° C. using the same solvent as in Example 3. The catalyst used was a mixture of 1 mol titanium trichloride and 0.1 mol diethyl aluminum monochloride. Upon termination of the reaction, the bulk of the hydrocarbon fraction was separated by filtration and the polymer was then freed from the residues of solvent by a treatment with steam and subsequently dried. The resultant polymer had a molecular weight of about 50,000 and an ash content of 0.22% by weight.

100 grams of this polymer were treated in a stirring vessel for about 3 hours and at about 80° C. with 1000 ml. 99.8% isopropyl alcohol which had previously been saturated with hydrogen chloride. During this treatment, a slight stream of hydrogen chloride was passed through the stirring vessel. Following this, the polymer was filtered off, freed from acid by washing with alcohol, and dried. The finished product had an ash content of 0.007% by weight and gave a pressed film of pure white color.

EXAMPLE 10

The polymer of ethylene was obtained at about 80° C. using the same solvent as in Example 3. The catalyst used was a mixture of 1 mol titanium trichloride and 1 mol triethyl aluminum. Upon termination of the polymerization, the bulk of the hydrocarbon fraction was separated by filtration and the polymer was freed from the residues of solvent by a treatment with steam and dried. In this manner, a polymer having a molecular weight of about 1,000,000 and an ash content of 0.17% by weight was obtained.

100 grams of this polymer were treated in a stirring vessel for about 3 hours and at 90° with 800 ml. 98% secondary butyl alcohol which had previously been saturated with hydrogen chloride. During this treatment, a slight stream of hydrogen chloride was passed through the stirring vessel. Following this, the polymer was filtered off, freed from acid by washing with alcohol, and dried. The finished product obtained had an ash content of 0.007% by weight and gave a pressed film of pure white color.

EXAMPLE 11

The polymerization was effected at about 80° C. using the same solvent as in Example 3. The catalyst used was a mixture of 1 mol titanium tetrachloride and 3 mols triethyl aluminum. Upon termination of the polymerization, the bulk of the auxiliary liquid was separated by filtration and the polymer was freed from the residues of solvent by a treatment with steam and subsequently dried. The resultant polymer had a molecular weight of about 1,000,000 and an ash content of 0.16% by weight.

100 grams of this polymer were treated in a stirring vessel for about 3 hours and at about 75° C. with 800 ml. 99.5% n-propyl alcohol which had previously been saturated with hydrogen chloride. During this treatment, a slight stream of hydrogen chloride was passed through the stirring vessel. Following this, the polymer was filtered off, freed from acid by washing with alcohol, and dried. The finished product had an ash content of 0.003% and gave a pressed film of pure white color.

As can be seen from the examples, it is important that a slight excess of hydrogen chloride be maintained at all times in the alcoholic solution of the same. It is this feature which assures the desired effect of decreasing the ash content, or content of residual catalyst, to a percentage as low as stated in these examples. The beneficial effect of gaseous hydrogen chloride dissolved in alcohol has been shown in Example 1. However, in order to establish further that it is specifically the combination of a lower aliphatic alcohol with an excess of hydrogen chloride, the applicants have made three comparative tests. These will be described below. In the first test, a mixture of a concentrated HCl and an equal volume of acetone was used; in the second, acetone saturated with HCl was employed, and the third test was made according to the present invention. As will be seen from the results, not only was the ash content of Tests 1 and 2 very high as compared to Test 3, but the polymer obtained according to Tests 1 and 2 was discolored, whereas the one prepared according to the present invention (Test 3) was pure white.

All three tests were made using a polyethylene which was obtained at temperatures of approximately 75–80° C. in the presence of a catalyst mixture consisting of 1 mol titanium tetrachloride and 2 mols triisobutyl aluminum, and in the presence of a saturated aliphatic $C_8$–$C_{10}$ hydrocarbon fraction which had been carefully purified by hydrogenation.

After separation of the main quantity of the hydrocarbon fraction by filtration, remainders of the same were removed from the polymer by treatment with steam. Subsequently, the polymer was dried. The polyethylene thus obtained had a molecular weight of approximately 500,000 and an ash content of 0.10 percent by weight.

This polyethylene was the starting material for all three experiments which follow:

*Test No. 1*

100 g. of the above material were treated in a vessel equipped with agitator, with a mixture consisting of 500 ml. acetone and 500 ml. conc. HCl for 2 hours at a temperature of approximately 70° C. After that, the polymer was filtered off and washed with acetone until free from acid. After drying, the final product was a polyethylene having an ash content of approximately 0.055 percent. A disc molded from this polymer had an intensely yellow color.

*Test No. 2*

100 g. of the same starting material, as described above, were treated in a vessel equipped with agitator with 100 ml. acetone which previously had been saturated with HCl for 2 hours at approximately 60° C. All during that time, small amounts of HCl were introduced into the vessel. The polymer was then filtered off, washed acid-free with acetone and dried. The polyethylene thus treated had an ash content of 0.015. The disc molded from this product was even more intensely yellow in color than the one produced in Test 1.

*Test No. 3*

The purification in this test was carried out according to the present invention. 100 g. of the starting material were treated in a vessel equipped with agitator with 100 ml. isopropanol (concn. 99.8%) which previously had been saturated with HCl gas for 2 hours at approximately 70° C. Simultaneously, throughout the heating and agitation period, a small stream of gaseous HCl was introduced into the vessel. After that, the polymer was filtered off, washed acid-free with alcohol and dried.

The product thus obtained had an ash content of 0.001 percent by weight. A disc molded from this polymer had a pure white color. This is the color which today is taken for granted by polyethylene fabricators, particularly injection molders and extruders.

What we claim is:

A process for the purification of highly polymerized ethylene, produced by the polymerization of ethylene with catalysts consisting of mixtures of aluminum compounds, selected from the group consisting of aluminum ethyl compounds and aluminum butyl compounds, with titanium tetrachloride in the presence of an organic solvent, which comprises separating said organic solvent from the polymerized products and thereafter treating the latter at 60–80° C. with an alcohol selected from the group consisting of methanol, ethanol, n-propanol, isopropanol, n-butanol and secondary butanol, having previously been saturated with gaseous hydrochloric acid and being kept saturated during said treatment by introduction of sufficient gaseous hydrochloric acid so that a slight excess thereof continuously escapes throughout said treatment, and finally neutralizing the product by washing.

References Cited in the file of this patent

UNITED STATES PATENTS

| | | |
|---|---|---|
| 2,827,445 | Bartolomeo et al. | Mar. 18, 1958 |
| 2,827,446 | Breslow | Mar. 18, 1958 |
| 2,838,447 | Roelen et al. | June 10, 1958 |
| 2,843,577 | Friedlander et al. | July 15, 1958 |
| 2,846,427 | Findlay | Aug. 5, 1958 |

FOREIGN PATENTS

| | | |
|---|---|---|
| 533,362 | Belgium | May 16, 1955 |
| 534,792 | Belgium | Jan. 31, 1955 |